United States Patent [19]

Sasaki et al.

[11] Patent Number: 4,941,037
[45] Date of Patent: Jul. 10, 1990

[54] COLOR IMAGE PROCESSING METHOD AND APPARATUS IN WHICH A GRADATION-CONVERTED LUMINANCE SIGNAL AND TWO NON-LINEARLY QUANTIZED COLOR-DIFFERENCE SIGNALS HAVING FEWER BITS THAN THE LUMINANCE SIGNAL ARE USED TO ADDRESS A COLOR MASKING ROM

[75] Inventors: Takashi Sasaki; Yoshiro Udagawa, both of Tokyo, Japan

[73] Assignee: Canon Kabushiki Kaisha, Tokyo, Japan

[21] Appl. No.: 188,644

[22] Filed: May 2, 1988

Related U.S. Application Data

[63] Continuation of Ser. No. 838,784, Mar. 12, 1986, abandoned.

[30] Foreign Application Priority Data

Mar. 21, 1985 [JP] Japan ................. 60-56632

[51] Int. Cl.⁵ .................. G03F 3/08; H04N 1/40; H04N 1/46
[52] U.S. Cl. ..................................... 358/80; 358/75
[58] Field of Search ............... 358/75, 75 IJ, 78, 80

[56] References Cited

U.S. PATENT DOCUMENTS

| 4,058,828 | 11/1977 | Ladd | 358/80 |
| 4,402,015 | 8/1983 | Yamada | 358/80 |
| 4,418,358 | 11/1983 | Poetsch et al. | 358/80 |
| 4,636,844 | 1/1987 | Sasaki | 358/80 |
| 4,661,843 | 4/1987 | Sekizawa et al. | 358/80 |
| 4,667,228 | 5/1987 | Kawamura et al. | 358/80 |
| 4,672,433 | 6/1987 | Yamamoto et al. | 358/80 |
| 4,675,704 | 6/1987 | Yamamoto | 358/80 |
| 4,731,662 | 3/1988 | Udagawa et al. | 358/80 |
| 4,864,392 | 9/1989 | Sato | 358/80 |

FOREIGN PATENT DOCUMENTS

| 0142975 | 5/1985 | European Pat. Off. | 358/75 |
| 0168818 | 1/1986 | European Pat. Off. | 358/75 |
| 59-210771 | 11/1984 | Japan | 358/80 |
| 60-35878 | 2/1985 | Japan | 358/75 |
| 60-96980 | 5/1985 | Japan | 358/78 |

Primary Examiner—Edward L. Coles, Sr.
Assistant Examiner—Randall S. Svihla
Attorney, Agent, or Firm—Fitzpatrick, Cella, Harper & Scinto

[57] ABSTRACT

A color image processing method and apparatus uses a luminance signal (Y) and two color difference signals (R−Y and B−Y). The luminance signal is subjected to gradation conversion using a plurality of tables in a gradation converter in accordance with a predetermined conversion characteristic, such as a histogram distribution of the luminance signals; the color difference signals are non-linearly quantized. Masking is performed by a storage circuit that stores color signal levels to be output using the converted luminance signal and the quantized color difference signals as inputs. As an additional feature, the number of bits in each of the quantized color difference signals is less than the number of bits in the converted luminance signal.

19 Claims, 2 Drawing Sheets

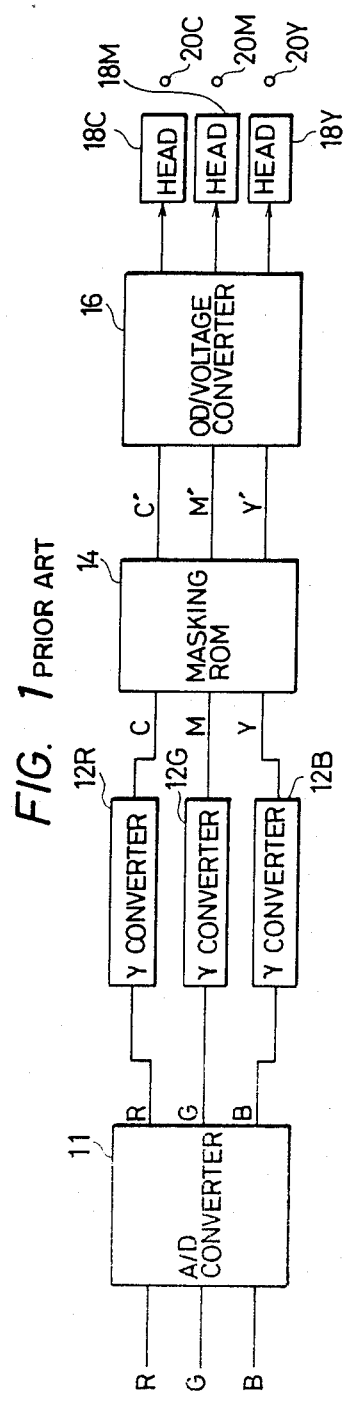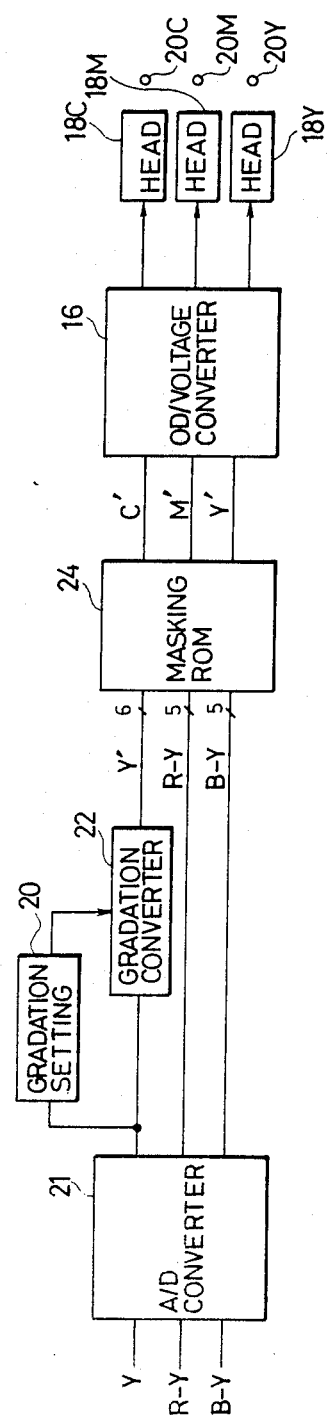

COLOR IMAGE PROCESSING METHOD AND APPARATUS IN WHICH A GRADATION-CONVERTED LUMINANCE SIGNAL AND TWO NON-LINEARLY QUANTIZED COLOR-DIFFERENCE SIGNALS HAVING FEWER BITS THAN THE LUMINANCE SIGNAL ARE USED TO ADDRESS A COLOR MASKING ROM

This application is a continuation of application Ser. No. 838,784 filed Mar. 12, 1986, now abandoned.

BACKGROUND OF THE INVENTION

1. Field of the Invention

The present invention relates to a color image processing method for obtaining primary color signals to form a color image from an input color image signal.

2. Related background art

FIG. 1 is a block diagram of an ink jet printer for forming a color image from a video signal, wherein a conventional signal processing technique is specifically shown. The description of the operation associated with FIG. 1 will be given hereinunder. Input signals R, G and B are converted into digital signals by an A/D converter 11 and thereafter, the converted signals are respectively input to gamma ($\gamma$) converters 12R, 12G and 12B which perform gradation and complementary color conversions, whereat the digital color signals R, G and B are converted into gradation-converted complementary color signals C, M and Y. The signals C, M and Y are subjected to a masking process by means of a masking ROM 14 for eliminating impurity components of ink (inhomogeneous color components) and thereafter become C', M' and Y', which are signals representative of the optical densities of ink (OD values). The signals C', M' and Y' are respectively converted by an OD/voltage converter 16 into analog drive voltages necessary for driving heads 18C, 18M and 18Y and obtaining the OD values. The analog drive voltages are respectively applied to the corresponding heads to discharge ink droplets 20C, 20M and 20Y therefrom to form a desired color image on a recording medium (not shown).

According to the related art, the gamma ($\gamma$) converter 12 is required to be provided for each color signal, thus resulting in a large circuit construction. Furthermore, as to the masking ROM made of masking conversion tables, it is difficult to reduce the capacity of the ROM because the capacity reduction affects the color reproduction fidelity.

SUMMARY OF THE INVENTION

It is an object of the present invention to provide a color image processing method eliminating the above-described related art disadvantages.

It is another object of the present invention to provide a color image processing method capable of reducing the capacity of a masking conversion table while maintaining a high reproduction fidelity of a color image.

It is a further object of the present invention to provide a color image processing method capable of reproducing a color image matching a visual characteristic of human eyes.

Speaking in detail, it is an object of the present invention to provide a color image procssing method whereby a masking process is conducted using as its input a luminance signal and two color-difference signals to obtain primary color signals forming a color image.

The above and other objects of the present invention will become apparent from the following detailed description and the accompanying drawings.

BRIEF DESCRIPTION OF THE DRAWINGS

FIG. 1 is a block diagram illustrating processings for a color image signal according to a conventional method;

FIG. 2 is a block diagram illustrating processings for a color image signal according to one embodiment of the color image processing method of the present invention;

DESCRIPTION OF THE PREFERRED EMBODIMENTS

Figure 3:
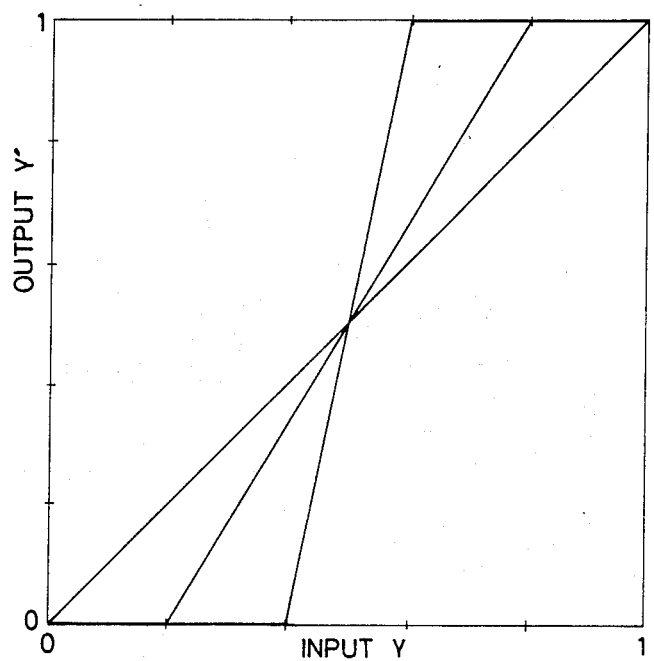
FIG. 3 is a graph showing a relationship between input and output signals of the gradation converter of FIG. 2.

The present invention will now be described in connection with an embodiment applied to an ink jet printer obtaining a color image from a color video signal. FIG. 2 is a block diagram illustrating signal processings of this embodiment, wherein elements having the same function as that shown in FIG. 1 have been designated by identical reference numerals. In FIG. 2 reference numeral 21 represents an A/D converter using as its input a luminance signal Y and two color-difference signals (R−Y) and (B−Y), reference numeral 20 represents a gradation conversion characteristic setting unit for setting a gradation characteristic, and reference numeral 22 represents a gradation converter for converting the gradation of the luminance signal Y. Reference numeral 24 represents a masking ROM for performing a masking operation using as its input the gradation converted luminance signal Y' and the color-difference signals (R−Y) and (B−Y). The luminance signal is converted by the A/D converter 21 into a digital signal which is input to the gradation characteristic setting unit 20 and the gradation converter 22. The gradation converter 22 is provided, for example, as a plurality of conversion tables having input/output characteristics as shown in FIG. 3. One of the conversion tables is selected based on a command from the setting unit 20 which selects a conversion characteristic in accordance with, for example, the detected histogram distribution of the luminance signal Y, or the maximum and minimum value thereof. The luminance signal Y' subjected to a gradation conversion is input as an address to one input terminal of the masking ROM 24. Whereas the color-difference signals (R−Y) and (B−Y) are converted into digital signals and directly input as addresses to the corresponding input terminals of the masking ROM 24.

The masking ROM 24 of this embodiment performs three functions; i.e., an RGB conversion from Y', (R−Y) and (B−Y) into R, G and B, and a complementary color conversion and a masking process from R, G and B into C, M and Y. These three conversions can be achieved at the same time by using a conversion table. The reason for this will be explained in the following.

First, the RGB conversion is performed as follows:

$$R = (R-Y) + Y$$

$$B = (B-Y) + Y$$

$$G = (Y - 0.30R - 0.11B)/0.59$$

Next, the complementary color conversion is performed as follows:

$$C = -\log(R/R_0)$$

$$M = -\log(G/G_0)$$

$$Y = -\log(B/B_0)$$

wherein $R_0$, $G_0$ and $B_0$ are constants.

Lastly, the masking process from C, M and Y is performed as follows:

$$\begin{pmatrix} C' \\ M' \\ Y' \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} C \\ M \\ Y \end{pmatrix}$$

As seen from the above, the OD values of C', M' and Y' can be obtained unambiguously from Y', (R−Y) and (B−Y). In the masking ROM 24, the values of C', M' and Y' are stored whose addresses are respectively identified by the digital values of Y', (R−Y) and (B−Y) serving respectively as the upper, middle and lower addresses. The parameters $a_{11}$ to $a_{33}$ of the masking matrix can be determined by using the method of least squares and the measured results of colors obtained at an actual color printing.

Since the masking ROM 24 uses as its input the luminance signal Y' and color-difference signals (R−Y) and (B−Y), it is possible to reduce the data capacity of the masking table by assigning a larger number of bits to the luminance signal and a smaller number of bits to the color-difference signals. taking the characteristics of human vision into consideration. In this embodiment, six bits are assigned to Y', while five bits are assigned to the respective (R−Y) and (B−Y). In such a case, the capacity of the masking ROM 24 becomes 512K bits and can be constructed of two ROMs of 256K bits. Assuming here that the values of R, G and B are $0 \leq R$, G and $B \leq 1$, then the range of the values of Y', (R−Y) and (B−Y) is:

$$0 \leq Y' \leq 1$$

$$-0.7 \leq (R-Y) \leq 0.7$$

$$-0.89 \leq (B-Y) \leq 0.89$$

Figure 4:
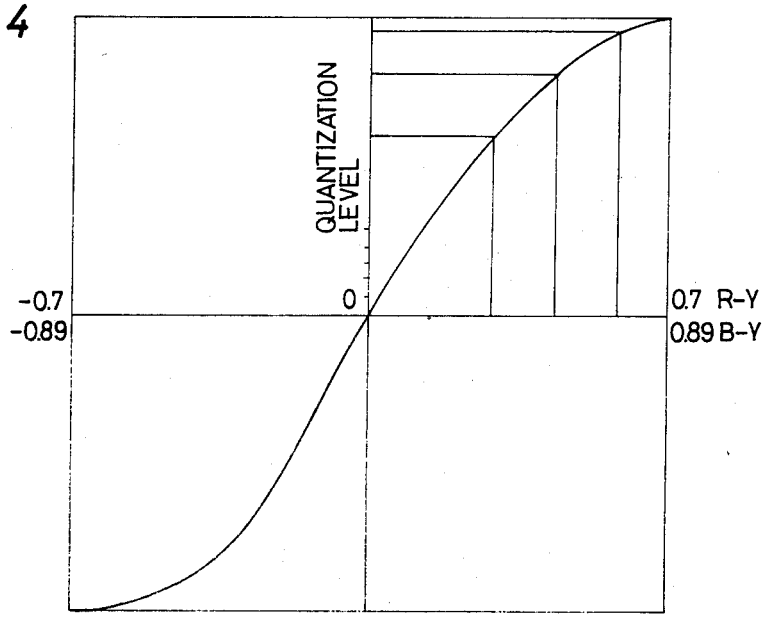
FIG. 4 is a graph showing a relationship between input and output signals of the A/D converter of FIG. 2.

In this embodiment, (R−Y) and (B−Y) are subjected to a non-linear quantization at the A/D converter 21, as shown in FIG. 4, so that a subtle intermediate gradation color can be reproduced more faithfully. The input signals are preferably of a luminance/color-difference type as of Y, (R−Y) and (B−Y). However, when the input signals are R, G and B, an encoder is provided at the preceding stage of the A/D converter for converting into the signals of a luminance/color-difference type. Furthermore, in the above embodiment, although a luminance signal Y and color-difference signals (R−Y) and (B−Y) are used, it is possible to use various signals such as Luv* series, Lab* series, YIQ series, XYZ series and so on.

As seen from the foregoing description of the present invention, a masking process is performed by using the signals of a luminance/color-difference type to thereby enable reducing the capacity of the masking circuit taking the characteristics of human vision into consideration. Furthermore, a gradation conversion is performed only for a luminance signal to conduct the gradation characteristic conversion for the overall output primary color signals. Therefore, the circuit construction of the gradation conversion can also be made small.

The present invention is not limited to the above embodiments, but various applications and modifications are possible without departing from the scope of the claims.

We claim:

1. A color image processing method comprising the steps of:
    obtaining a luminance signal and two color difference signals based on primary colors;
    gradation converting said luminance signal in accordance with a characteristic thereof to provide a converted luminance signal having a number of bits;
    non-linearly quantizing said two color difference signals to provide two quantized color difference signals each having a number of bits, wherein the number of bits of each of said quantized color difference signals is smaller than the number of bits of said converted luminance signal;
    performing a masking process using masking process means that includes a storage circuit for storing a plurality of complementary color signal levels at addresses of said storage circuit and for accepting as an input address said converted luminance signal and said two quantized color difference signals to provide as an output at least one of said complementary color signal levels stored in said storage circuit; and
    providing said output complementary color signal levels to a color printing device.

2. A color image processing method according to claim 1, wherein said storage circuit includes a read-only memory.

3. A color image processing method according to claim 1, wherein said step of non-linearly quantizing said two color difference signals includes the step of non-linearly quantizing two analog color difference signals to obtain two digital color difference signals.

4. A color image processing method according to claim 1, wherein said luminance signal and said two color difference signals obtained in said obtaining step include analog signals.

5. A color image processing method according to claim 1, wherein said gradation converting step uses a characteristic according to a histogram distribution of said luminance signal.

6. A color image processing method according to claim 1, wherein said complementary color signal levels include yellow (Y), magenta (M) and cyan (C) signal levels.

7. A color image processing method according to claim 1, wherein said two color difference signals include an R−Y signal and a B−Y signal.

8. A color image processing apparatus comprising:
    means for obtaining a luminance signal and two color difference signals based on primary colors;
    means for gradation converting said luminance signal in accordance with a characteristic thereof to provide a converted luminance signal having a number of bits;

means for non-linearly quantizing said two color difference signals to provide two quantized color difference signals each having a number of bits, wherein the number of bits of each of said quantized color difference signals is smaller than the number of bits of said converted luminance signal;

masking process means that includes a storage circuit for storing a plurality of complementary color signal levels at addresses of said storage circuit and for accepting as an input address said converted luminance signal and said two quantized color difference signals to provide as an output at least one of said complementary color signal levels stored in said storage circuit; and supply means for supplying said output complementary color signal levels to a color printing device.

9. A color image processing apparatus according to claim 8, wherein said storage circuit includes a read-only memory.

10. A color image processing apparatus according to claim 8, wherein said luminance signal and said two color difference signals obtained by said obtaining means include analog signals.

11. A color image processing apparatus according to claim 8, wherein said gradation converting means performs the conversion with a characteristic according to a histogram distribution of said luminance signal.

12. A color image processing apparatus according to claim 8, wherein said complementary color signal levels include yellow (Y), magenta (M) and cyan (C) signal levels.

13. A color image processing apparatus according to claim 8, wherein said two color difference signals include an R−Y signal and a B−Y signal.

14. A color image processing apparatus comprising:

supplying means for supplying a luminance signal and two color difference signals based on primary colors;

processing means for processing said luminance signal and said two color difference signals supplied by said supplying means, wherein said processing means performs processing for said luminance signal and said two color difference signals, the processing for said luminance signal and the processing for said two color difference signals being different from each other; and output means for accepting said luminance signal and said two color difference signals and outputting a masking-processed complementary color signal, wherein said output means includes a memory circuit for storing levels of said complementary color signal accessed using as an input address a value according to said luminance signal and said two color difference signals processed by said processing means.

15. A color image processing apparatus according to claim 14, wherein said memory circuit includes a read-only memory.

16. A color image processing apparatus according to claim 14, wherein said luminance signal and said two color difference signals comprise bits and the number of bits of each of said two color difference signals is smaller that the number of bits of said luminance signal.

17. A color image processing apparatus according to claim 14, wherein said supplying means supplies said luminance signal and said two color difference signals as digital signals.

18. A color image processing apparatus according to claim 14, further comprising means for providing said masking-processed complementary color signal to a printer.

19. A color image processing apparatus according to claim 14, wherein said processing means non-linearly quantizes said two color difference signals and gradation converts said luminance signal in accordance with a characteristic thereof.

* * * * *